Oct. 19, 1965    H. L. HAYES    3,212,609
AUTOMATIC COCKING DEVICE FOR CLUTCHES
Filed June 11, 1962    2 Sheets-Sheet 2

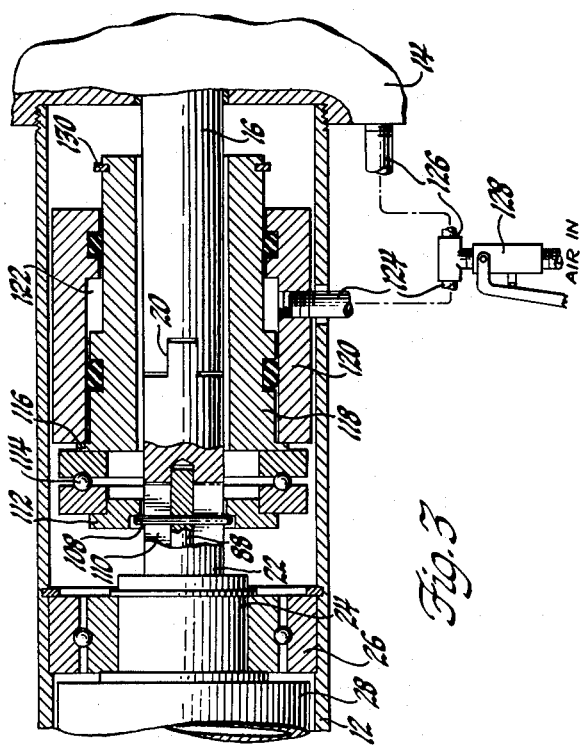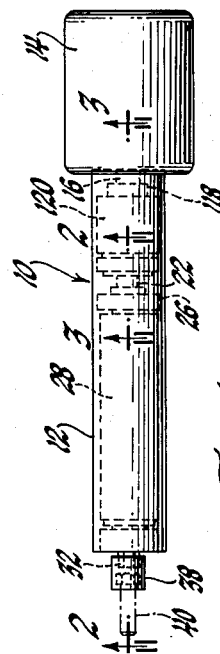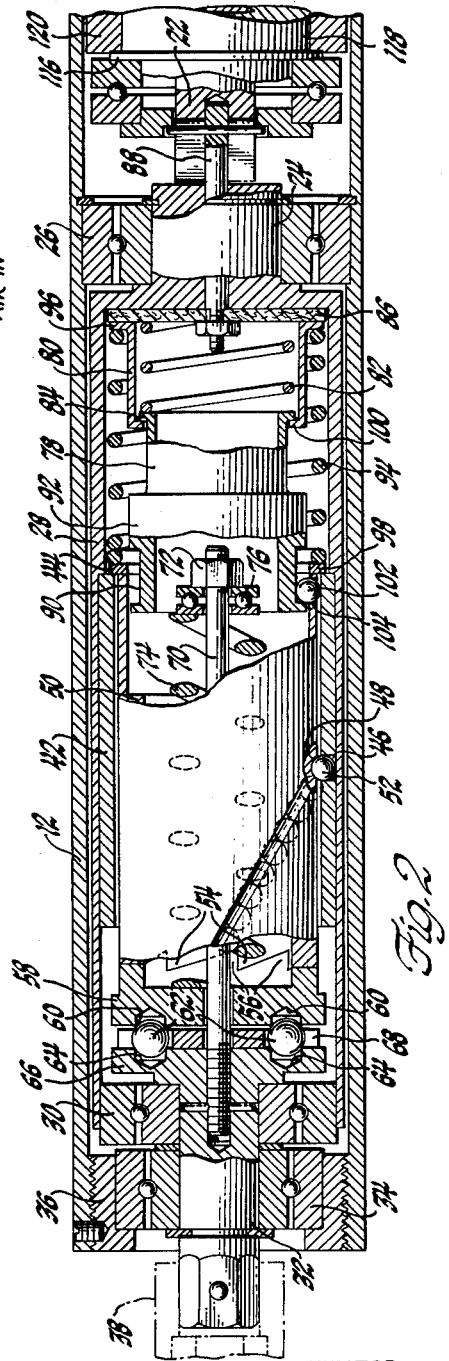

INVENTOR.
Henry L. Hayes
BY
Barnard & McGlynn
ATTORNEY

United States Patent Office 3,212,609
Patented Oct. 19, 1965

3,212,609
AUTOMATIC COCKING DEVICE FOR CLUTCHES
Henry L. Hayes, Clawson, Mich., assignor to Roark
Toark Tool Company, Madison Heights, Mich., a
corporation of Michigan
Filed June 11, 1962, Ser. No. 201,426
14 Claims. (Cl. 192—.096)

This invention relates to a cocking mechanism for clutches of various types and, in particular, to an automatically operable cocking mechanism for torque responsive clutches of the type utilized in torque transmitting machine tools.

Although the present invention may be utilized to advantage in other environments, an understanding thereof will be facilitated by specific reference to its use in the machine tool art for which it was specifically designed. Thus, machine tools of the type to which the present invention particularly pertains have typically comprised a suitable motor driven drive shaft adapted to be selectively coupled and uncoupled through drive means including a torque responsive clutch mechanism to a driven member equipped with a socket or the like for threading nuts on bolts and similar applications. As the nut is threaded home on its bolt, a predetermined resistance torque is generated which acts automatically to disengage the torque responsive clutch mechanism and interrupt drive between the drive and driven shafts, although the drive motor may continue to run. The tool may then be removed from the particular workpiece involved and placed on another to repeat the cycle.

However, in prior tools of this type, prior to reactuating the drive motor to operate on another workpiece, it is first necessary to cock the tool so as to be operable to retain the torque responsive clutch meachnism out of driving engagement with the driven shaft upon reaching the predetermined resistance torque at the workpiece. More specifically, in tools of this type, the torque responsive clutch means has included a clutch sleeve or the like axially reciprocable between a clutch engaging position to conduct drive between the drive and driven shafts and a clutch disengaging position interrupting such drive. Means have been provided for locking the clutch sleeve or equivalent element in its clutch disengaging position, but it is necessary to cock the aforementioned means or pre-dispose it in position to perform such a locking function each time the tool operates on a workpiece. Generally speaking, this has been accomplished by first engaging the tool with a workpiece, and then the tool operator manually depressing the entire tool toward the workpiece to so cock or predispose certain components of it in a position whereby the clutch sleeve or the like of the torque responsive cluch mechanism will lock in a clutch disengaging position upon the predetermined resistance torque being reached.

Apart from the fact that cocking of a clutch mechanism of this type requires manipulation of the tool and manual effort by the operator thereof prior to each time a nut or other workpiece is to be operated upon, such manually cocked tools or clutches are very difficult to handle when used in multiple units in a fixture hand guided to and from a plurality of workpieces. In such multiple installations, considerable difficulty is encountered in properly manually depressing the plurality of tool units to insure cocking of each thereof.

It is, therefore, a principal object and feature of this invention to provide a rotary drive transmission mechanism comprising rotatable drive and driven shafts adapted to be selectively drivingly coupled and uncoupled through drive means including clutch means movable between drive transmitting and disconnecting positions, mechanism for locking said clutch means in its drive disconnecting position, and means for power operating the drive shaft and automatically and substantially simultaneously cocking said mechanism to predispose it in position to retain the clutch means in the drive disconnecting position upon movement of the latter thereto from the drive transmitting position.

It is yet another object and features of this invention to provide a torque transmitting tool comprising rotatable drive and driven shafts adapted to be drivingly coupled through drive means including torque responsive clutch means movable between a first position drivingly connecting said shafts and a second position disconnecting them, clutch control or cocking means movable between an uncocked position permitting movement of said clutch means toward said first position and a cocked position for locking the clutch means in said second position, and means for automatically actuating said clutch control or cocking means in response to power actuation and deactuation of the drive shaft of the tool.

It is yet another object and feature of this invention to provide a device of the type aforedescribed further characterized by the fact that the clutch control or cocking means is automatically actuated upon deactuation of power to the drive shaft to permit the clutch means to move automatically from its drive disengaging position to its drive engaging position whereby the tool is immediately ready for another driving cycle upon removal from a previously worked upon workpiece.

It is yet another object and feature of this invention to provide an automatic cocking mechanism for rotary torque responsive clutches of the type aforementioned utilized on an installation of multiple machine tools on a hand guided fixture whereby, in responsive to power actuation of the drive motors of the respective tools, the cocking mechanisms thereof are automatically cocked to hold the rotary torque responsive clutch means thereof in clutch-disengaging position upon a predetermined resistance torque being reached in the respective workpieces operated upon by the tools.

These and other objects, features and advantages of the invention will become more apparent hereinafter as the description of the invention proceeds and in which reference is made to the drawings, in which:

FIGURE 1 is an elevational view of a power driven machine tool illustrating a preferred embodiment of the invention;

FIGURE 2 is an enlarged fragmentary sectional view taken on line 2—2 of FIGURE 1, and illustrates the relative positions of various components of the machine tool with the latter uncocked;

FIGURE 3 is an enlarged fragmentary sectional view taken on line 3—3 of FIGURE 1, and likewise illustrates components of the machine tool with the latter uncocked;

Figure 4:
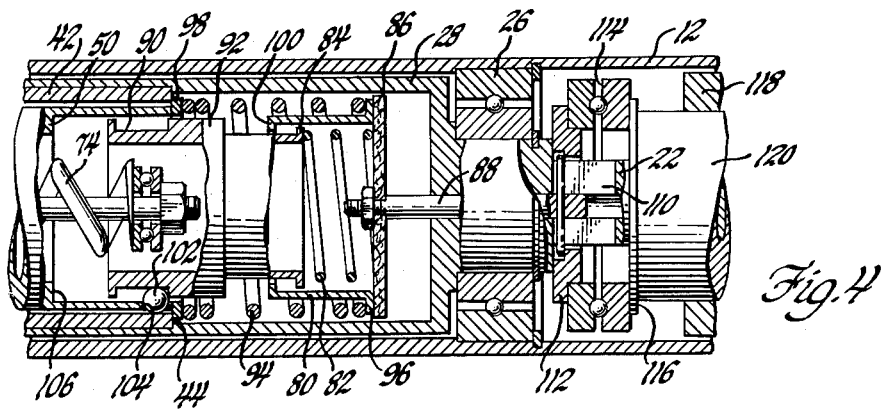
FIGURE 4 is a sectional view corresponding generally to FIGURE 2, but illustrating the relative positions of certain components of the machine tool with the latter cocked.
Figure 5:
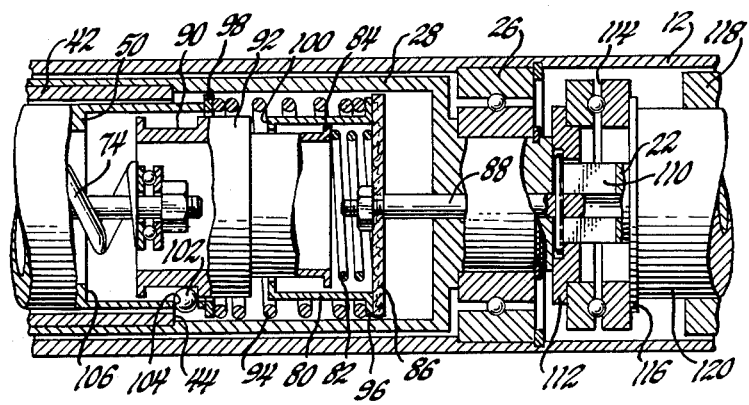
Figure 6:
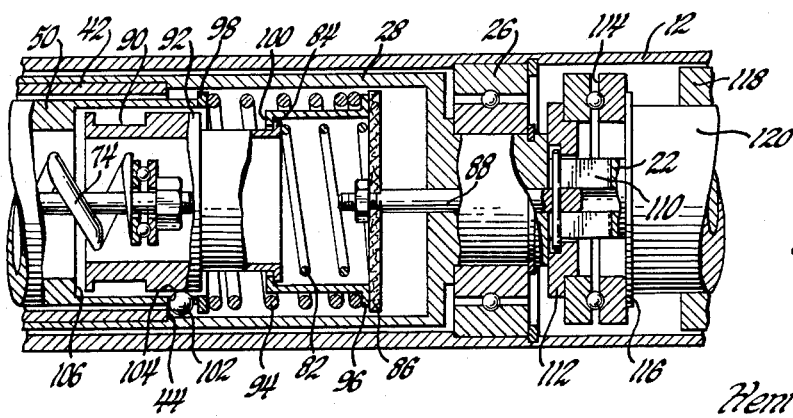

FIGURE 5 is a view corresponding generally to FIGURE 4, but illustrating the disposition of the components of the machine tool after the torque responsive clutch means thereof has moved to a position intermediate its drive engaging and disengaging positions; and FIGURE 6 is a view corresponding generally to FIGURES 4 and 5, but illustrating the disposition of the components of the machine tool after the clutch means has completely disengaged and is locked in its drive disengaging position although the tool motor is still running.

Referring now to the drawings, a power driven machine tool is illustrated generally at 10 and comprises an outer cylindrical housing 12 having a motor housing 14 secured at one end thereof which, in this case, houses a compressed air driven motor of conventional construction. The output shaft 16 of the motor is suitably drivingly coupled as indicated at 20 to one end of the tool drive shaft 22 extending coaxially of the housing 12 and having a hub portion 24 suitably rotatably supported therein as by the sealed bearing set 26. The hub portion 24 of the drive shaft is formed integral with or otherwise rigidly secured to one end of an elongate cylindrical drive sleeve 28 having its opposite end suitably rotatably supported as by the sealed bearing set 30 on a power output or driven shaft 32 rotatably supported within and at the other end of the housing 12 as by another sealed bearing set 34 held therein by the threaded cap screw 36. One end of the driven shaft 32 extends axially outwardly from the housing 12 and is adapted to have removably connected thereto in the usual manner a socket or chuck 38 for engaging a workpiece such as a nut or the head of a bolt 40.

An inner cylindrical sleeve 42 is suitably rigidly secured to the drive sleeve 28 so as to form at one end thereof an annular locking shoulder 44 as illustrated best in FIGURE 5. The inner cylindrical sleeve 42 further includes a plurality, preferably three in number, of circumferentially spaced inclined grooves 46 opposite corresponding grooves 48 of an inner cylindrical clutch sleeve 50. A plurality of driving balls 52 are disposed between each of the cooperating grooves carried by the sleeve 42 and clutch sleeve 50 to conduct rotary drive therebetween. The clutch sleeve 50 includes a plurality of clutch teeth 54 at one end thereof axially engageable and disengageable with similar clutch teeth 56 of an annular clutch plate or collar 58 having a plurality of circumferentially spaced substantially cylindrical recesses 60 therein to receive ball members 62 similarly seatable in opposed cylindrical recesses 64 circumferentially spaced about the clutch plate or collar 66 formed integral with or otherwise rigidly secured to the rotatable driven shaft 32. The diameters of recesses 60 and 64 are slightly less than that of ball members 62. A ball spacer member 68 includes corresponding apertures therein receiving respective ones of the ball members 62 to retain them in predetermined spaced relationship corresponding to the spacing of the cylindrical recesses in the clutch plates or collars 58 and 66. In addition, a rod 70 has one end suitably secured to the driven shaft 32 and extends coaxially and freely through the spacer member 68 and clutch collar or plate 58 into clutch sleeve 50, and has an adjustable nut 72 at the other end thereof. A spring 74 has one end seated on a conventional thrust bearing 76 abutting the nut 72, while the other end thereof engages the clutch plate or collar 58 to continuously bias the latter toward the clutch plate or collar 66 for seating of the ball members 62 in the respective opposed cylindrical recesses 60 and 64 thereof.

The construction thus far described is essentially conventional in nature as shown and explained in my prior United States Patent No. 2,966,973, entitled "Torque Clutch" and granted January 3, 1961. Thus, in operation of the structure so far described, it will suffice to point out that the air motor within housing 14 rotatably drives the drive shaft 22, drive sleeve 28 secured thereto and, through the ball members 52, the clutch sleeve 50. Thus, with the clutch teeth 54 and 56 engaged and the ball members 62 seated in the opposed cylindrical recesses of the clutch plates or collars 58 and 66 as shown in FIGURE 2, drive is conducted through the clutch plates or collars to the driven shaft 32 and the socket or chuck 38 to operate upon a workpiece. After the workpiece is tightened and a predetermined resistance torque generated, continued operation of the drive motor causes ball members 62 to roll off their seats in the recesses 60 and 64 and to act as cams to shift the clutch plate or collar 58 and clutch sleeve 50 axially away from the clutch plate or collar 66 against the influence of spring 74, or to the right in FIGURE 2. As the ball members 62 move out of their respective recesses and between opposed plane faces of the clutch plates or collars, drive is, of course, interrupted between the clutch plates or collars even if the drive motor continues to run. However, the ball members 62 rapidly roll back into opposed recesses in the respective clutch plates or collars 58 and 66 under the biasing influence of spring 74, thereby being in position to re-establish drive to driven shaft 32 if clutch teeth 54 and 56 are engaged. Thus, if the clutch sleeve 50 is permitted to return to the drive transmitting position of FIGURE 2 with the clutch teeth 54 and 56 in engagement, a position toward which it is continuously urged by means to be described, drive will then again be conducted from the motor to the driven shaft 32 and the torque responsive clutch aforedescribed would go through another cycle of disengagement and re-engagement. However, according to this invention, means including an automatically operable clutch control or cocking mechanism are provided for the tool illustrated and aforedescribed to lock the clutch sleeve 50 in its axially shifted position to the right in FIGURE 2 whereby, upon reseating of the ball members 62 of the torque responsive clutch construction under the influence of the spring 74, the clutch teeth 54 and 56 will be disengaged to interrupt drive from the motor to the driven shaft 32.

To this end, there is provided a clutch control and cocking mechanism comprising the coaxial locking and cocking sleeves 78 and 80, respectively, mounted coaxially with the other elements of the machine tool. The inner locking sleeve 78 is continuously biased to the left in FIGURES 2 and 3 through 6 by a spring 82 engaging an annular stop shoulder 84 at one end thereof and resting on a support means or washer 86 suitably secured to a spindle 88 extending through and slidably mounted in the hub 24 of the drive shaft 22 for a purpose to be described, the washer 86 normally resting on the base of the cylindrical drive sleeve 28 in an uncocked position thereof as illustrated in FIGURE 2 with the tool out of engagement with a workpiece as will appear more fully hereinafter. The inner locking sleeve further includes at the other end thereof an annular control surface or groove 90 and an intermediate annular control surface 92 of larger diameter than the surface or groove 90. Another spring 94, stronger than the spring 82, engages an annular shoulder 96 at one end of the outer cocking sleeve 80 and extends between the latter and an annular washer 98 surrounding locking sleeve 78, freely slidably mounted within the drive sleeve 28 and abutable with the end of the clutch sleeve 50 remote from the clutch teeth 54 thereon and the locking shoulder 44. The spring 94 continuously urges shoulder 96 on the cocking sleeve 80 against washer 86 and the clutch sleeve 50 to the left in FIGURES 2 and 4 through 6 for engagement of the clutch teeth 54 thereon with clutch teeth 56 of the clutch collar or plate 58. An annular stop shoulder 100 at the other end of the cocking sleeve 80 cooperates with the annular stop shoulder 84 on the locking sleeve to limit axial movement of the latter to the left in FIGURES 2 and 4 through 6 under the influence of the spring 82.

A plurality of locking balls 102, preferably three in number, are carried within apertures 104 circumferentially spaced about the clutch sleeve 50 immediately adjacent the end thereof engageable with the washer 98. The function of these locking balls is to selectively lock the clutch sleeve 50 in an axially shifted position to the right of that shown in FIGURE 2 upon disengagement of the torque responsive clutch means previously described. This is accomplished by reason of the clutch sleeve 50 moving axially to the right in FIGURES 2 and 4 through 6 causing the end thereof to move the washer 98 against spring 94 to compress the latter, and to permit the locking balls 102 to move radially outwardly against the drive sleeve 28 underneath the locking shoulder 44. As long as these locking balls are held in this position, the clutch sleeve 50 is prevented from being moved to the left under the influence of spring 94. It is the function of the locking and cocking sleeves 78 and 80 to control locking engagement and disengagement of the clutch sleeve as will now be explained.

Upon engaging the socket or chuck 38 of the tool with a workpiece to be rotated and energizing the drive motor, means to be hereinafter described axially reciprocates the spindle 88 and washer 86 from the uncocked position of FIGURE 2 to the cocked position of FIGURE 4. In so moving to the position of FIGURE 4, the inner locking sleeve 78 remains substantially axially stationary due to the confining coaction of control surface or groove 90 thereon with the locking balls 102 confined on clutch sleeve 50. Thus, cocking sleeve 80 is moved to the left relative to the locking sleeve to axially separate the annular stop shoulders 100 and 84 respectively carried thereby a predetermined distance from each other, thereby compressing springs 82 and 94. Ultimately, operation of the tool causes the torque responsive clutch means to disengage as previously explained, causing the clutch sleeve 50 to move axially to the right from the position of FIGURE 4 through an intermediate position as illustrated in FIGURE 5 to the locked position of FIGURE 6. In so moving, the washer 98 further compresses the spring 94 and locking balls 102 force the locking sleeve 78 toward washer 86 thereby further compressing spring 82. Ultimately, the locking balls 102 reach a position radially opposite the annular locking shoulder 44. At this time, the compressed spring 82 "fires" or reciprocates the locking sleeve 78 axially to the left as the control surface or groove 90 cams the locking balls 102 radially outwardly beneath the annular locking shoulder 44. In this position, and as illustrated in FIGURE 6, it will be noted that the larger diameter control surface 92 of the locking sleeve retains the locking balls beneath the locking shoulder 44. Consequently, the clutch sleeve 50 is prevented from moving to the left under the influence of spring 94 to re-engage clutch teeth 54 thereof with the clutch teeth 56 of clutch plate or collar 58.

While FIGURE 6 illustrates that axial movement of the locking sleeve to the left as aforedescribed is limited by engagement of the annular stop shoulder 84 thereof with the annular stop shoulder 100 of the cocking sleeve 80, such axial movement may be limited in other ways as, for example, by abutment of the end of the locking sleeve 78 adjacent control surface or groove 90 with the annular interior shoulder 106 on the clutch sleeve 50. In this regard, it is only necessary that the stop shoulders have related positions on the locking and cocking sleeves whereby cocking of the mechanism as illustrated in FIGURE 4 and aforedescribed axially separates the stop shoulders sufficiently to enable the locking sleeve 78 to "fire" to the position of FIGURE 6, while enabling the stop shoulder 100 to reengage or pick-up the stop shoulder 84 on the locking sleeve to return the sleeves to the position of FIGURE 2 as will now be described.

Clutch sleeve 50 is released by relieving the operating force on the spindle 88 to permit the spring 94 to re-expand to again dispose the washer 86 against the base of the cylindrical drive sleeve 28. As this occurs, the annular stop shoulder 100 of the cocking sleeve will reengage the stop shoulder 84 on the locking sleeve, if not already engaged therewith as illustrated in FIGURE 6, to pull the latter axially therewith to the right until such time as a portion of the smaller control surface or groove 90 is radially opposite the locking balls 102. As a result of the thrust exerted by the spring 94 on washer 98 engaging the end of the clutch sleeve 50, the locking balls are cammed radially inwardly of the control surface or groove 90 from beneath the locking shoulder 44. Consequently, the clutch sleeve 50 is released and biased axially to the left due to the influence of the spring 94. The clutch teeth 54 and 56 are then reengaged and all components of the tool disposed as illustrated in FIGURE 2, but the tool must be again cocked before another workpiece is operated upon to insure that, upon another cycle of axial movement of the clutch sleeve 50, it will be locked in the position of FIGURE 6 when a predetermined resistance torque is reached.

According to another aspect of this invention, movement of the spindle 88 and, hence, the clutch control or cocking mechanism is controlled concurrently with the operation of the tool motor. Thus, and referring particularly to FIGURE 3, the spindle 88 includes a cross pin 108 riding in an elongate slot 110 in the drive shaft 22. The opposite ends of the cross pin extend radially beyond the drive shaft and are seated against a washer 112 connected to a rotatable thrust bearing 114 abutable with an annular shoulder 116 at one end of a piston member 118 disposed within a cylinder member 120 suitably secured in a fixed position in the housing 12. The piston member 118 is axially slidably mounted relative to the cylinder member and shafts 16 and 22 and non-rotatable with the latter. The piston and cylinder assembly includes a cooperating annular sealed motor chamber 122 to which air under pressure is adapted to be supplied through a conduit 124. The conduit 124, and the conduit 126 for supplying air under pressure to the tool motor in housing 14 are connected in parallel to a suitable hand throttle valve indicated at 128 and connected to the air source. The piston and cylinder assembly is shown in the uncocked position in FIGURES 2 and 3 of the drawings, and the piston member 118 is adapted to be reciprocated within the cylinder member 120 to the position shown in FIGURES 4 through 6 upon supplying compressed air to the chamber 122, movement of the piston member being limited by abutment of a stop ring 130 at one end thereof with the adjacent end of the cylinder member 120.

In operation, the chuck or socket 38 may be engaged with a workpiece to be rotated. At this time, the tool is in the position illustrated in FIGURES 2 and 3. Upon operation of the throttle valve 128, air is supplied under pressure to the tool motor to drive the shaft 16 and concurrently to the motor chamber 122 to reciprocate the piston member 118 to the left in FIGURE 3 as limited by engagement of the stop ring 130 with the cylinder member 120. The thrust of the piston member is transmitted through the thrust bearing 114, washer 112, pin 108 and spindle 88 to axially reciprocate the washer 86 to the position of FIGURE 4 to cock the tool as previously described. Thereafter, the tool operates as previously described to "fire" the locking sleeve 78 and disrupt drive to the workpiece upon a predetermined resistance torque being reached. Thereafter, the throttle valve 128 may be released permitting the motor chamber 122 of the piston and cylinder assembly to vent through the conduit 124 and 126 and the usual vent in the tool motor. Concurrently therewith, spring 94 extends as aforedescribed causing the spindle 88 to move the washer 112 against the thrust bearing 114 to drive the piston member 118 back to the position of FIGURES 2 and 3. At the same time, the stop shoulders 84 and 100 carried by the locking and cocking sleeves cooperate to dispose the mechanism in an uncocked position as previously described.

While but one form of the invention has been shown and described, other forms will now be apparent to those skilled in the art. Therefore, it will be understood that the embodiment shown in the drawing and described above is merely for illustrative purposes, and is not intended to limit the scope of the invention which is defined by the claims which follow.

I claim:

1. In combination, a rotary drive transmitting mechanism comprising a rotatable drive shaft, a rotatable driven shaft coaxial with said drive shaft, drive means including clutch means axially movable between a first position drivingly connecting said shafts and a second position disconnecting said shafts, clutch control means axially movable between an uncocked position permitting movement of said clutch means toward said first position and a cocked position for locking said clutch means in said second position, a fluid pressure operated drive motor connected to said drive shaft to drive the latter, a fluid pressure operated motor assembly including relatively reciprocable piston and cylinder elements, one of said elements being fixed, means connecting the other of said elements to said clutch control means to move the latter between said positions thereof, and means for simultaneously supplying an exhausting fluid under pressure to and form said drive motor and motor assembly to substantially simultaneously drive said drive shaft and move said clutch control means to said cocked position thereof and to interrupt drive to said drive shaft and move said clutch control means to said uncocked position thereof.

2. A torque transmitting tool comprising a rotatable drive shaft, a rotatable driven shaft coaxial with said drive shaft, drive means including torque responsive clutch means axially movable in response to a predetermined torque between a first position drivingly connecting said shafts and a second position disconnecting said shafts, clutch control means axially movable between an uncocked position permitting movement of said clutch means toward said first position and a cocked position for locking said clutch means in said second position, a fluid pressure operated drive motor connected to said drive shaft to drive the latter, a fluid pressure operated motor assembly including relatively reciprocable piston and cylinder elements mounted non-rotatably and coaxially about said drive shaft, one of said elements being fixed, means connecting the other of said elements to said clutch control means to move the latter between said positions thereof, and means for simultaneously supplying an exhausting fluid under pressure to and from said drive motor and motor assembly to substantially simultaneously drive said drive shaft and move said clutch control means to said cocked position thereof and to interrupt drive to said drive shaft and move said clutch control means to said uncocked position thereof.

3. A torque transmitting tool comprising a housing, a drive shaft including a drive sleeve rotatably supported within said housing, a driven tool shaft rotatably supported within said housing coaxial with said drive shaft, drive means including a torque responsive clutch sleeve axially movable relative to said drive sleeve in response to a predetermined torque between a first position drivingly connecting said shafts and a second position disconnecting said shafts, cooperable locking means carried by said drive and clutch sleeves and engageable to hold the latter in said second position thereof and disengageable to release said clutch sleeve for movement toward said first position thereof, clutch control means axially movable within said drive sleeve between an uncocked position permitting disengagement of said locking means and a cocked position preventing disengagement thereof to lock said clutch sleeve in said second position thereof, motor means connected to said drive shaft to drive the latter, and means for substantially simultaneously energizing said motor means and moving said clutch control means to said cocked position thereof.

4. The torque transmitting tool as defined in claim 3 in wihch said cooperable locking means carried by said drive and clutch sleeves respectively comprise an annular locking shoulder on the interior of said drive sleeve and locking ball means mounted on said clutch sleeve for movement radially thereof into and out of engagement with said locking shoulder with said clutch sleeve in said second position thereof, and in which said clutch control means in the respective positions thereof engages said locking ball means to control engagement and disengagement thereof with said locking shoulder.

5. A torque transmitting tool comprising a housing, a drive shaft including a drive sleeve rotatably supported within said housing, a driven tool shaft rotatably supported within said housing coaxial with said drive shaft, drive means including a torque responsive clutch sleeve axially movable within said drive sleeve in response to a predetermined torque between a first position drivingly connecting said shafts and a second position disconnecting said shafts, cooperable locking means carried by said drive and clutch sleeves and engageable to hold the latter in said second position thereof and disengageable to release said clutch sleeve for movement toward said first position thereof, clutch control means axially movable within said drive sleeve between an uncocked position permitting disengagement of said locking means and a cocked position preventing disengagement thereof to lock said clutch sleeve in said second position thereof, a fluid pressure operated drive motor connected to said drive shaft, a fluid pressure operated motor assembly including relatively reciprocable piston and cylinder elements mounted non-rotatably and coaxially about said drive shaft, one of said elements being fixed to said housing, means connecting the other of said elements to said clutch control means to move the latter between said positions thereof, and means for simultaneously supplying and exhausting fluid under pressure to and from said drive motor and motor assembly to substantially simultaneously drive said drive shaft and move said clutch control means to said cocked position thereof and to interrupt drive to said drive shaft and move said clutch control means to said uncocked position thereof.

6. The torque transmitting tool as defined in claim 5 in which said cooperable locking means carried by said drive and clutch sleeves respectively comprise an annular locking shoulder on the interior of said drive sleeve and locking ball means mounted on said clutch sleeve for movement radially thereof into and out of engagement with said locking shoulder with said clutch sleeve in said position thereof, and in which said clutch control means comprises support means axially movable within said drive sleeve by said motor assembly, a cocking sleeve seated on said support means and including stop means thereon, a locking sleeve axially reciprocable relative to said cocking sleeve and including stop means thereon engageable and disengageable with said stop means on said cocking sleeve, a first ball-engaging surface on said locking sleeve permitting radial movement of said locking ball means out of engagement with said locking shoulder, a second ball-engaging surface on said locking sleeve axially spaced from and of larger diameter than said first surface and engageable with said locking ball means to prevent disengagement thereof from said locking shoulder, and spring means acting on said locking sleeve to continuously bias said stop means on the latter toward engagement with said stop means on said cocking sleeve, said support means having an uncocked position in which engagement of said stop means prevents said second surface from engaging said locking ball means against said locking shoulder and a cocked position axially toward said clutch sleeve in which said stop means permit such engagement.

7. The torque transmitting tool as defined in claim 6 further comprising second spring means acting between said clutch sleeve and said cocking sleeve to continuously bias them axially apart and the latter against said support means.

8. A torque transmitting tool comprising a housing, a drive shaft including a drive sleeve rotatably supported within said housing, a driven tool shaft rotatably supported within said housing coaxial with said drive shaft, drive means including a torque responsive clutch sleeve axially movable within said drive sleeve in response to a predetermined torque between a first position drivingly connecting said shafts and a second position disconnecting said shafts, an annular locking shoulder on the interior of said drive sleeve, locking ball means mounted on said clutch sleeve for movement radially thereof into and out of engagement with said locking shoulder with said clutch sleeve in said second position thereof, support means axially movable within said drive sleeve, a cocking sleeve having one end thereof seated on said support means and an annular stop shoulder at the other end thereof, a locking sleeve axially reciprocable relative to said cocking sleeve and including an annular stop shoulder at one end thereof engageable and disengageable with said stop shoulder on said cocking sleeve, a first annular ball-engaging surface at the other end of said locking sleeve permitting radial movement of said locking ball means out of engagement with said locking shoulder, a second annular ball-engaging surface axially spaced from and of larger diameter than said first surface and engageable with said locking ball means to prevent disengagement thereof from said locking shoulder, first spring means acting between said clutch sleeve and said cocking sleeve to continuously bias them axially apart and the latter against said support means, second spring means acting between said support means and said locking sleeve to continuously bias the stop shoulder on the latter toward engagement with the stop shoulder on said cocking sleeve, said support means having an uncocked position in which engagement of said stop shoulders prevents said second surface from engaging said locking ball means against said locking shoulder and a cocked position axially toward said clutch sleeve in which said stop shoulders permit such engagement, a fluid pressure operated drive motor connected to said drive shaft, a fluid pressure operated motor assembly including relatively reciprocable piston and cylinder elements mounted non-rotatably and coaxially about said drive shaft, one of said elements being fixed to said housing, means connecting the other of said elements to said support means, and means including a control valve for simultaneously supplying and exhausting fluid under pressure to and from said drive motor and motor assembly to substantially simultaneously drive said drive shaft and move said support means to said cocked position and to interrupt drive to said drive shaft and move said support means to said uncocked position.

9. A rotary drive transmitting mechanism comprising a rotatable drive shaft, a rotatable driven shaft, drive means including clutch means movable between a first position drivingly connecting said shafts and a second position disconnecting said shafts, cooperable locking means operable between one of said shafts and said clutch means to hold the latter in said second position thereof and being releaseable to release said clutch means for movement toward said first position, clutch control means movable between an uncocked position permitting release of said locking means and a cocked position in which to subsequently engage said locking means to prevent disengagement thereof upon movement of said clutch means to said second position thereof, motor means connected to said drive shaft to drive the latter, and means for substantially simultaneously energizing said motor means and moving said clutch control means to said cocked position thereof and for substantially simultaneously de-energizing said motor means and moving said clutch control means to said uncocked position thereof, said clutch control means comprising support means movable axially in opposite directions in response to energization and de-energization of said motor means respectively, a cocking sleeve seated on said support means and including stop means thereon, and a locking sleeve axially reciprocable relative to said cocking sleeve and including stop means thereon engageable and disengageable with said stop means on said cocking sleeve, said support means having an uncocked position in which engagement of said stop means holds said locking sleeve in position permitting release of said locking means in said second position of said clutch means and an axially spaced cocked position in which said stop means permits said locking sleeve to move axially relative to said cocking sleeve to prevent release of said locking means in said second position of said clutch means.

10. The rotary drive transmitting mechanism as defined in claim 9 further comprising spring means continuously urging the stop means of said cocking and locking sleeves into engagement.

11. The rotary drive transmitting mechanism as defined in claim 9 further comprising spring means continuously urging the stop means of said cocking and locking sleeve into engagement, and second spring means acting between said clutch means and said cocking sleeve to continuously bias them axially apart and the latter against said support means.

12. A rotary drive transmitting mechanism comprising a rotatable drive shaft, a rotatable driven shaft, drive means including clutch means movable between a first position drivingly connecting said shafts and a second position disconnecting said shafts, cooperable locking means operable between one of said shafts and said clutch means to hold the latter in said second position thereof and being releaseable to release said clutch means for movement toward said first position, clutch control means movable between an uncocked position permitting release of said locking means and a cocked position in which to subsequently engage said locking means to prevent disengagement thereof upon movement of said clutch means to said second position thereof, motor means connected to said drive shaft to drive the latter, and means for substantially simultaneously energizing said motor means and moving said clutch control means to said cocked position thereof and for substantially simultaneously de-energizing said motor means and moving said clutch control means to said uncocked position thereof, said clutch control means comprising support means movable axially in opposite directions in response to energization and de-energization of said motor respectively, a cocking sleeve seated on said support means and including stop means thereon, a locking sleeve axially reciprocable relative to said cocking sleeve and including stop means thereon engageable and disengageable with said stop means on said cocking sleeve, a first surface on said locking sleeve permitting release of said locking means, a second surface on said locking sleeve axially spaced from said first surface and engageable with said locking means to prevent disengagement thereof, and spring means acting on said locking sleeve to continuously bias said stop means on the latter toward engagement with said stop means on said cocking sleeve.

13. The rotary drive transmitting mechanism as defined in claim 12 further comprising second spring means acting between said clutch means and said cocking sleeve to continuously bias them axially apart and the latter against said support means.

14. A rotary drive transmitting mechanism comprising a rotatable drive shaft, a rotatable driven shaft, drive means including clutch means movable between a first position drivingly connecting said shafts and a second position disconnecting said shafts, cooperable locking means operable between one of said shafts and said clutch means to hold the latter in said second position thereof and being releaseable to release said clutch means for movement toward said first position, clutch control means movable between an uncocked position permitting release of said locking means and a cocked position in which to subsequently engage said locking means to prevent disengagement thereof upon movement of said clutch means to said second position thereof, motor means connected to said drive shaft to drive the latter, and means for substantially simultaneously energizing said motor means and moving said clutch control means to said cocked position thereof and for substantially simultaneously de-energizing said motor means and moving cooperable locking means comprising an annular locking shoulder on said one shaft and locking ball means mounted on said clutch means for movement radially thereof into and out of engagement with said locking shoulder with said clutch means in said second position thereof, said clutch control means comprising support means axially movable in opposite directions relative to said one shaft, relatively axially reciprocable cocking and locking sleeves including cooperable stop means thereon, said cocking sleeve being seated on said support means, a first ball-engaging surface on said locking sleeve permitting radial movement of said locking ball means out of engagement with said locking shoulder, a second ball-engaging surface on said locking sleeve axially spaced from and of larger diameter than said first surface and engageable with said locking ball means to prevent disengagement thereof from said locking shoulder, and spring means acting on said locking sleeve to continuously bias said stop means on the latter toward engagement with said stop means on the cocking sleeve, said support means having an uncocked position in which engagement of said stop means prevents said second surface from engaging said locking ball means against said locking shoulder and a cocked position axially spaced from said uncocked position in which said stop means permits axial movement of said locking sleeve relative to said cocking sleeve to permit such engagement.

References Cited by the Examiner
UNITED STATES PATENTS

| | | | |
|---|---|---|---|
| 2,700,443 | 1/55 | Boice | 192—.096 |
| 2,743,635 | 5/56 | Shaff | 192—56 |
| 2,963,134 | 12/60 | Banner | 81—52.4 |
| 2,964,152 | 12/60 | Banner | 192—56 |

DAVID J. WILLIAMOWSKY, *Primary Examiner.*
ROBERT C. RIORDAN, *Examiner.*